June 18, 1968     B. LAST ET AL     3,388,595
FLOW METER
Filed Dec. 27, 1965     3 Sheets-Sheet 1
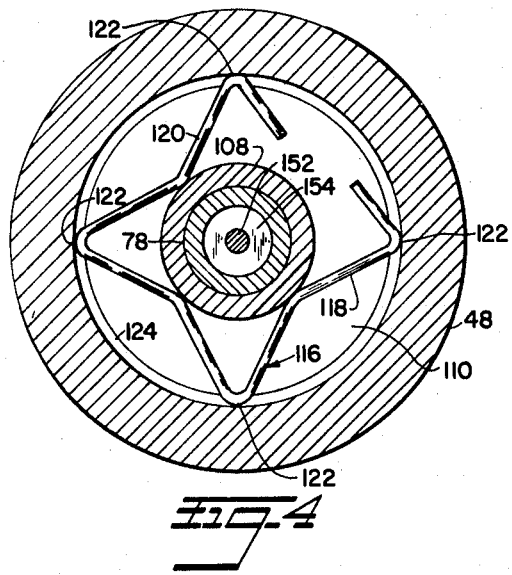
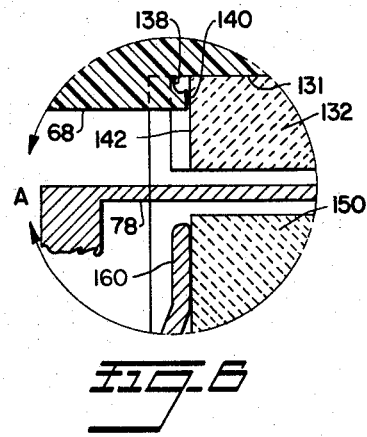
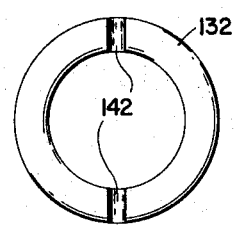
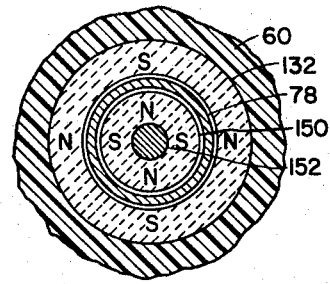
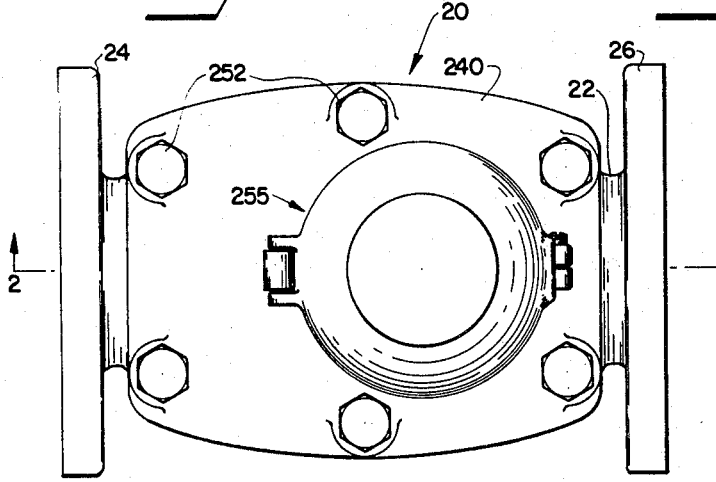
INVENTOR
BERNARD LAST
GEORGE D. ANDERSON
BY
Strauch, Nolan, Neale, Nies & Bronaugh
ATTORNEYS

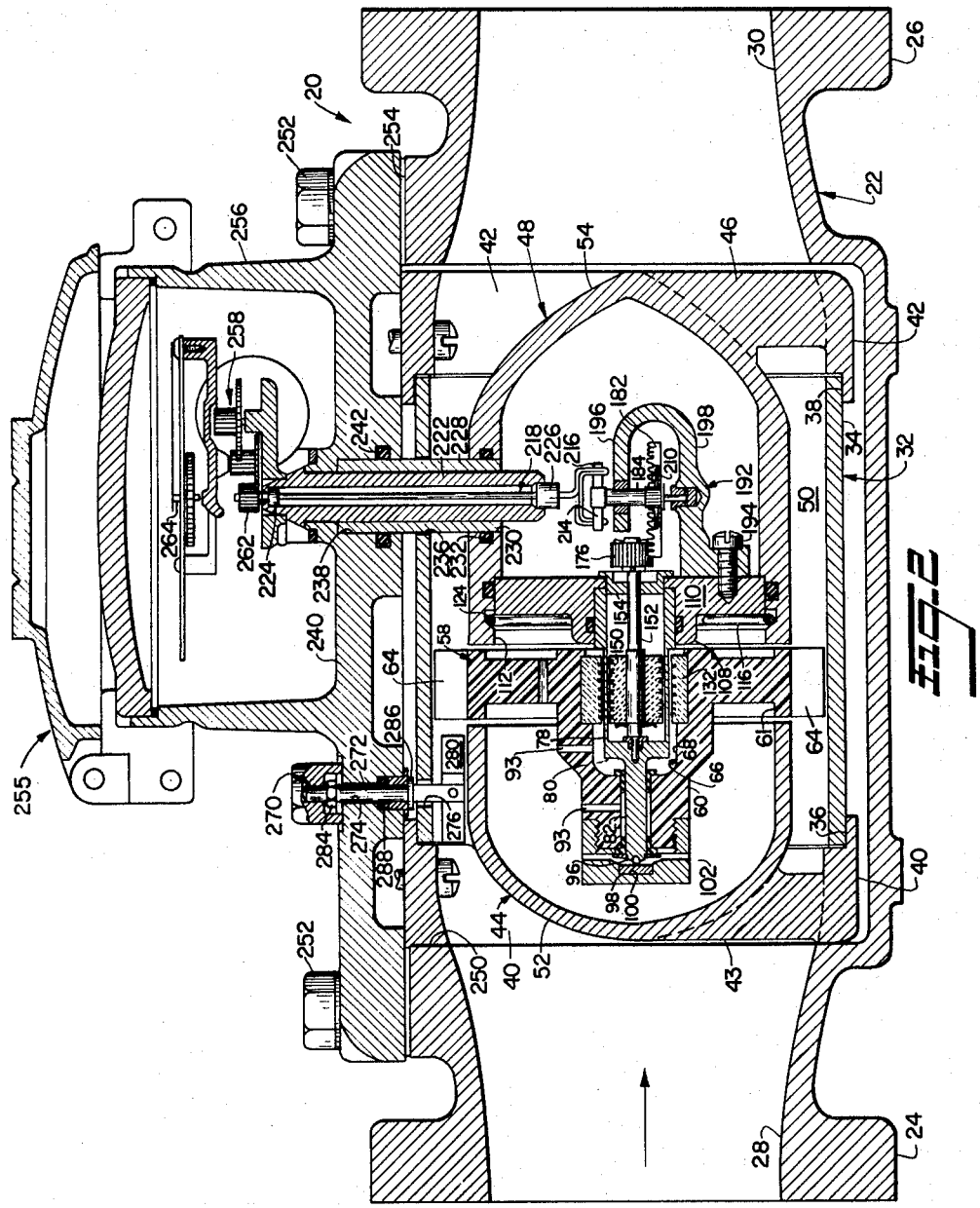

June 18, 1968  B. LAST ET AL  3,388,595
FLOW METER
Filed Dec. 27, 1965  3 Sheets-Sheet 3
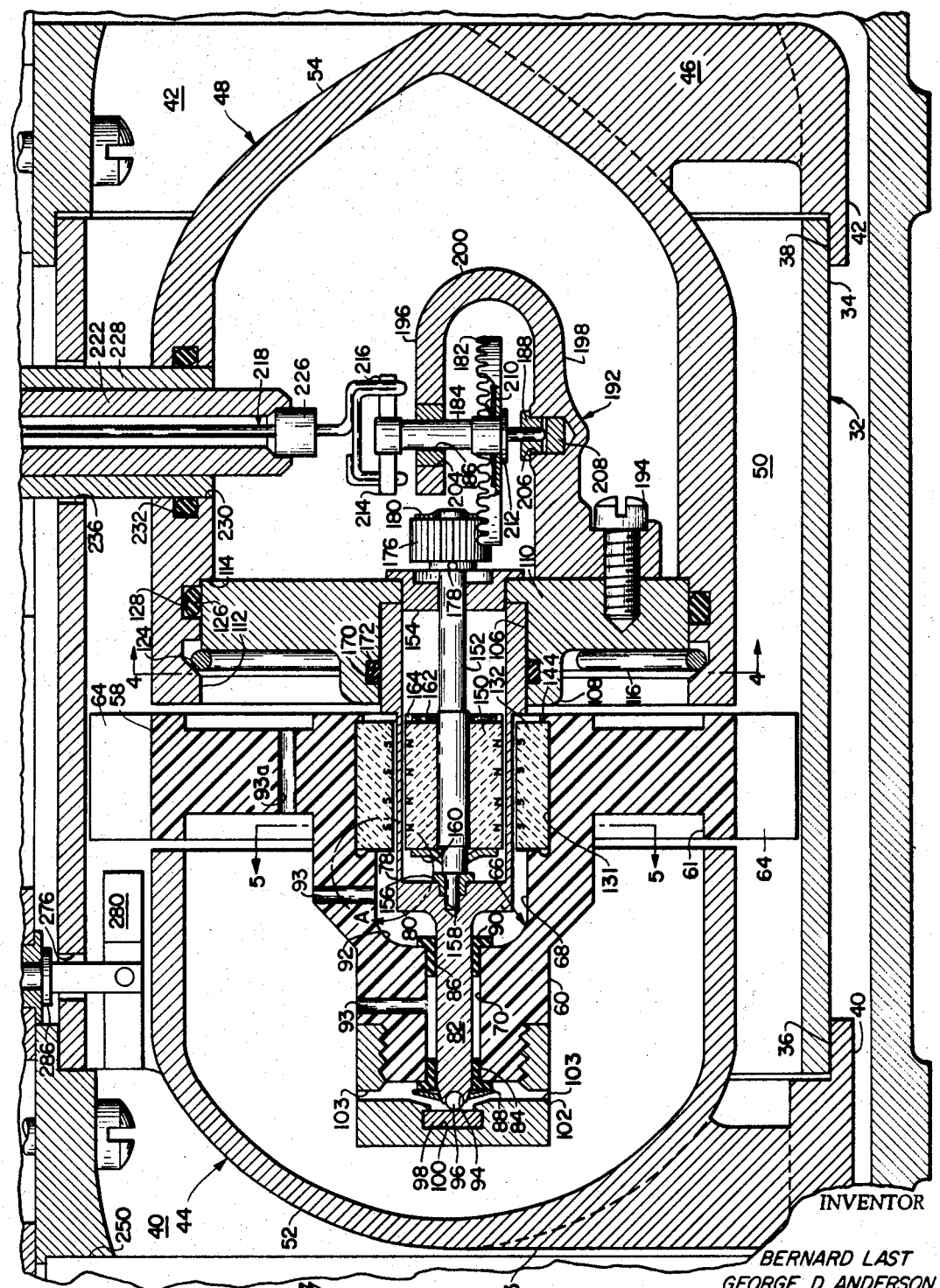
INVENTOR
BERNARD LAST
GEORGE D. ANDERSON
BY
Strauch, Nolan, Neale, Nies & Bronaugh
ATTORNEYS 3,388,595
FLOW METER
Bernard Last and George D. Anderson, Uniontown, Pa.,
assignors to Rockwell Manufacturing Company, Pittsburgh, Pa., a corporation of Pennsylvania
Filed Dec. 27, 1965, Ser. No. 517,403
7 Claims. (Cl. 73—231)

ABSTRACT OF THE DISCLOSURE

An axial flow meter having a rotatable metering rotor driven by fluid flow through the meter housing and drive connected to a register or the like by a radial gap type magnetic coupling. The drive magnet of the coupling is fixed to the rotor, and the driven magnet is connected to the register by a drive train. The drive train comprises a pinion and crown gear connection which is arranged to permit sufficient relative axial play between the drive and driven magnets that they are self aligning under the influence of their magnetic interaction.

---

The present invention relates to fluid flow meters of the volumetric type.

In flow meters of the type with which this invention is especially concerned, a rotatable, fluid driven, bladed metering rotor is operatively connected to a register or the like by a drive train. The drive train advantageously includes a magnetic coupling assembly to eliminate the need for stuffing boxes or the like to isolate the register assembly from the fluid flowing through the meter housing. For radial gap magnetic couplings, it is desirable that the poles on the drive and driven magnets are radially aligned to provide a strong and efficient magnet interaction and thereby assure that all of the revolutions made by the rotor will be registered throughout the flow rate range of the meter.

One of the major objects of this invention is to provide a novel meter register drive train having a radial gap magnetic coupling and a gear connection which permits sufficient relative axial play between the drive and driven magnets of the coupling that they are self-aligning under the influence of their magnetic interaction.

According to the preferred embodiment of this invention, the aforesaid gear connection comprises intermeshing pinion and crown gears rotatable about mutually perpendicular axes and respectively drive connected to the driven magnet and an input shaft to the meter register.

Another object of this invention is to provide a novel fluid driven rotor and magnetic coupling register drive assembly for improving metering accuracy by reducing the torque produced by mechanical friction and resisting rotation of the metering rotor.

According to this aspect of the present invention, a novel rotor and magnetic coupling support structure provides for a torque arm at the metering rotor support bearings that is very small with the result that the resistive torque produced by bearing friction is correspondingly minimized. This rotor support structure, on the other hand, is so constructed as to provide for a large torque arm on which the drive magnet acts to impart rotation to the driven magnet in the register drive train.

Still another object of this invention is to provide a novel fluid driven metering rotor assembly wherein the rotor is made of a material having a specific gravity substantially equal to that of the fluid being metered, thereby enabling the rotor to effectively float on its support in the meter housing. This reduces radial bearing loads which act to resist rotation of the rotor and thereby impair the accuracy of the meter.

Another object of this invention is to provide for a novel fluid driven rotor and register drive train assembly which is compact, simplified, and efficiently organized.

Further objects of this invention will appear as the description proceeds in connection with the appended claims and annexed drawings wherein:

FIGURE 1 is a top plan view of an axial flow meter constructed according to a preferred embodiment of this invention;

FIGURE 2 is a longitudinal section taken substantially along lines 2—2 of FIGURE 1;

FIGURE 3 is a fragmentary enlargement of the rotor, register drive train, and fluid guide structure illustrated in FIGURE 2;

FIGURE 4 is a section taken substantially along lines 4—4 of FIGURE 3;

FIGURE 5 is a section taken substantially along lines 5—5 of FIGURE 3;

FIGURE 6 is an enlargement of the structure contained in the circle marked A in FIGURE 3; and FIGURE 7 is an end view of the drive magnet illustrated in FIGURE 3.

Referring now to the drawings, and more particularly to FIGURES 1 and 2, the reference numeral 20 generally designates an axial flow turbine meter comprising a one-piece housing 22 having an essentially tubular configuration and terminating at opposite ends in radially extending pipe attachment flanges 24 and 26. The interior of housing 22 is formed at opposite ends with axially aligned, spaced apart inlet and outlet throats 28 and 30.

As shown in FIGURE 2, a fluid guide structure 32 coaxially mounted within housing 22 axially between throats 28 and 30 comprises a central sleeve 34. The opposite ends of sleeve 34 are seated in axially aligning stepped bores 36 and 38 which are respectively formed in rim sections 40 and 42. Sleeve 34, which is formed separately of rim sections 40 and 42, is peripherally supported by rim sections 40 and 42 and axially clamped between opposing annular shoulders formed in bores 36 and 38.

With continuing reference to FIGURE 2, rim section 40 is integrally joined by radial ribs 43 to an upstream core 44, and rim section 42 is integrally joined by radial ribs 46 to a downstream core 48. Cores 44 and 48 are spaced radially inwardly from the internal periphery of support sleeve 34 to define an annular flow channel 50 which opens at opposite ends into throats 28 and 30. All of the fluid flowing through the meter passes through channel 50.

With continuing reference to FIGURE 2, cores 44 and 48 are formed with closed, faired ends at 52 and 54 respectively to provide for a smooth turbulent-free divergence of fluid flowing from throat 28 into channel 50 and for a smooth, turbulent-free convergence of fluid flowing from channel 50 into throat 30. The diameters of the cylindrical peripheries of cores 44 and 48 are uniform and the same to provide channel 50 with uniformly diametered, coaxial inner and outer boundaries.

Referring to FIGURES 2 and 3, a turbine rotor 58 mounted between cores 44 and 48 is formed with a central hub 60 which is integrally joined to a concentric rim section 61. A series of equiangularly spaced apart turbine blades 64 are formed integral with and extend radially from rim section 61 around the periphery thereof. Blades 64 are inclined relative to axial flow of fluid through channel 50 to provide a small angle of attack. In this embodiment, blades 64 are straight and intersect the rotational axis of rotor 58 at an acute angle of approximately 55 degrees. For purposes that will presently become apparent, cores 44 and 48 are hollow and have opposed, open ends axially facing rotor 58.

Advantageously, rotor 58 is of one-piece construction and is made of material having a specific gravity equal to that of the fluid being metered. When metering flow of water, for example, the material for forming rotor 58 may be polyethylene or polypropylene or other suitable material having a specific gravity of approximately one. As a result, rotor 58 tends to float in the liquid being measured to minimize radial bearing loads.

Hub 60, as best shown in FIGURE 3, projects axially in an upstream direction into core 44 and is formed with a stepped bore 66. Bore 66 is formed with a diametrically enlarged downstream section 68 and a reduced diametered upstream section 70. Bore section 70 is formed in the nose of hub 60 extending into core 44 and bore section 68 is formed radially inwardly of blades 64 as shown. A non-magnetic, rigid, tubular, rotor support member 78 preferably made of stainless steel or like material coaxially extends into bore section 68 from the downstream end thereof. The upstream end of support member 78 is closed by an integral end wall 80. A cylindrical post 82 integral with wall 80 coaxially extends through bore section 70. Rotor 58 is journalled on post 82 by a pair of axially spaced apart sleeve bearings 84 and 86. Bearings 84 and 86 are carried by post 82 and have radial flanges 88 and 90 respectively engaging the upstream end of hub 60 and an annular shoulder 92 formed between bore sections 68 and 70. Rotor 58 thus is axially confined between flanges 88 and 90. The radial load on bearings 84 and 86 is materially reduced by forming rotor 58 with a material having a specific gravity closely equal to that of the fluid being metered.

Radial passages 93 formed in the hub of rotor 58 provide for fluid communication between the interior of the rotor hub and the interior of core 44 which is in fluid communication with channel 50. One of the passages 93 opens into bore section 70 between bearings 84 and 86, and another is shown to open into bore section 68 around support member 78. Passages 93 thus permit entrapped air to escape from confined regions within the rotor hub and allow fluid being metered to enter these confined spaces. At least one axial through passage 93a is formed in the portion of rotor 58 that integrally joins hub 60 to rim section 61 to assure that fluid pressure on opposite sides of the rotor is equalized. This construction of passages 93 and 93a enables rotor 58 to more effectively float in the fluid medium filling core 44 to minimize the radial loads on bearings 84 and 86.

Still referring to FIGURE 3, post 82 protrudes axially beyond the upstream end of bore section 70 and is formed with a socket 94. A thrust bearing, comprising a ball 96, is seated in socket 94 and bears against a thrust plate 98. Ball 96 is disposed axially between the upstream end of post 82 and thrust plate 98. Thrust plate 98 is seated in a flat-bottomed recess 100 formed in a nut 102 which is threaded onto the upstream end of hub 60. Radial passages 103 formed in nut 102 permit escape of confined air from the interior of nut 102 to enable rotor 58 to more effectively float in the fluid medium being metered.

Still referring to FIGURE 3, the downstream end of support member 78 extends beyond bore 66 and is received with a tight fit in a stepped bore 106. Bore 106 is formed through a central boss portion 108 which is integral with a support plate 110. Plate 110 is snugly, coaxially received in a smooth walled bore 112 formed inwardly of the open end of core 48. Plate 110 is axially confined between a retaining spring 116 and an annular axially facing shoulder 114 formed in core 48. Rotor 58 thus is supported from plate 110 in cantilever fashion by support member 78.

Spring 116, as shown in FIGURES 3 and 4, comprises a rod bent to provide resilient arm sections 118 and 120 which engage the side of plate 110 facing towards the upstream end of the meter. Retainer spring 116 is formed with equiangularly spaced apart portions 122 which extend radially into a an annular groove 124 opening into bore 112 in coaxial relation with the rotor rotational axis. A resilient O-ring 126 is seated in an inwardly opening annular groove 128 opening inwardly into bore 112 peripherally surrounds and is compressed against the periphery of plate 110 to establish a fluid-tight seal between plate 110 and core 48.

As best shown in FIGURES 3 and 5, the downstream end of bore 66 is formed with a diametrically enlarged section 131 which snugly, coaxially receives an annular, ceramic permanent drive magnet 132. Magnet 132 peripherally surrounds and is radially spaced from support member 78 in substantial radial alignment with blades 64.

As best shown in FIGURE 6, stepped bore 66 is formed with an annular shoulder 138 at the juncture between bore sections 68 and 131 and has integral projections 140 axially extending from diametrically opposed regions on shoulder 138. Projections 140 are snugly received in radially extending grooves 142 (see FIGURE 7) formed in the inner end face of magnet 132 to retain magnet 132 against rotation in bore section 131. Magnet 132 is confined between shoulder 138 and a radially inwardly extending lip 144 formed at the outer end of bore section 131. By molding rotor 58 from suitable plastic, lip 144 is sufficiently flexible to allow for the insertion of magnet 132 into bore section 131.

As shown in FIGURE 3, magnet 132 is magnetically coupled to a permanent ceramic annular magnet 150 which is coaxially received in support member 78. Magnet 150 is non-rotatably mounted on a rotor-driven shaft 152 which is coaxially journalled in support member 78 by axially spaced apart bushings 154 and 156. Bushing 156 is seated in a stepped bore 158 coaxially formed in end wall 80. Bushing 154 is received in the outer end of support member 78 as shown. Magnet 150 is axially confined on shaft 152 between a locking ring 160 and a pin 162. Pin 162 radially protrudes at both ends from shaft 152 and extends into radially aligned grooves 164 formed in the end face of magnet 150 to prevent magnet 150 from turning relative to shaft 152. The inner end of shaft 152 extending axially beyond bushing 156 is rotatably received in bore 158.

Magnets 132 and 150 are each preferably cylindrical and so polarized as to provide four poles on their adjacent surfaces with North (N) and South (S) poles 90 degrees apart as best shown in FIGURE 5, and with each pole extending the entire axial length of the magnet.

Still referring to FIGURE 3, a resilient O-ring 170 is seated in a groove 172 formed in bore 106. O-ring 170 peripherally surrounds and is compressed radially against the external periphery of support member 78 to establish a fluid-tight seal between support member 78 and plate 110.

Shaft 152, as shown in FIGURE 3, axially extends beyond support member 78 and into the interior of core 48. The inner end of shaft 152 in core 48 coaxially mounts a pinion 176. Pinion 176 is axially confined on shaft 152 between a pin 178 and a retainer ring 180. Pin 178 extends radially of shaft 152 and is received in grooves formed in the hub portion of pinion 176 to prevent rotation of pinion 176 relative to shaft 152.

As shown, pinion 176 constantly meshes with a crown gear 182 which is non-rotatably mounted on a vertical shaft 184. Shaft 184 is journalled in axially spaced apart bushings 186 and 188 for rotation about an axis normally intersecting the rotational axis of shaft 152. A support bracket 192 for bearings 186 and 188 is rigidly fixed to plate 110 by machine screws 194 (one shown in FIGURE 2) and is formed with parallel arms 196 and 198 rigidly joined together by a crosspiece 200. Arms 196 and 198 are respectively disposed vertically above and below crown gear 182. Bushing 186 is coaxially received in a bore 204 formed through arm 196. Bushing 188 is received in an upwardly opening blind bore 206 aligning with bore 204. The lower end of shaft 184 is seated on a thrust plate 208 in bore 206. Crown gear 182 is axially confined on shaft 184 between a retainer ring 210 and a shoulder 212.

By meshing pinion 176 with crown gear 182 and by providing a sliding fit for shaft 152 in bushings 154 and 156 and bore 158, the assembly of shaft 152 and magnet 150 are axially displaceable relative to the assembly of support member 78, rotor 58, and magnet 132. As a result, the magnetic coupling force exerted by magnet 132 axially displaces the assembly of magnet 150 and shaft 152 to a position where magnet 150 radially aligns with magnet 132. Alignment of magnets 150 and 132 in this manner provides for a maximum magnetic coupling to assure that shaft 152 rotates unitarily with rotor 58 for accurately registering the number of turns made by rotor 58. A strong magnetic coupling is especially important for meters of this type since fluid flow rate is determined by the number of registered rotor revolutions. A driving crank dog 214 fixed to the upper end of shaft 184 vertically above arm 196 engages a complemental dog member 216 on the lower end of a register through a bearing retainer sleeve 222 and is journalled by bearings 224 and 226 for rotation about an axis axially aligning with the rotational axis of shaft 184.

With continued reference to FIGURE 2, sleeve 222 coaxially extends with a tight fit through a tube 228. The lower end of tube 228 is coaxially received with a tight fit in a bore 230 formed in core 48 along an axis aligning with the rotational axes of shafts 184 and 218. A resilient, groove seated O-ring 232 peripherally surrounding tube 228 in bore 230 provides a fluid-tight seal between tube 228 and core 48.

Tube 228 extends freely through an aperture 236 formed in sleeve 34 along an axis aligning with bore 230. The upper end of tube 228 protruding beyond the periphery of sleeve 34 extends with a tight fit into a bore 238 formed in a cover plate 240 along an axis aligning with that of bore 230. A resilient, groove seated O-ring 242 circumferentially surrounds the periphery of tube 228 in bore 238 to establish a fluid-tight seal between cover plate 240 and tube 228.

Cover plate 240 extends over a side opening 250 formed in housing 22 about midway between flanges 24 and 26 and along an axis normally intersecting the longitudinal axis of the housing. Cover plate 240 is fixed by suitable machine screws 252 to a machine flanged face 254 on housing 22. The entire fluid guide structure consisting of cores 44 and 48, sleeve 34, and rim sections 40 and 42 together with rotor 58 and the register drive train just described are supported as a unitary assembly from cover plate 240 and are insertable and removable through opening 250 as a unit. Replacement of this unitary assembly is thus easily facilitated in the field without breaking the pipeline connections to flanges 24 and 26.

A meter register assembly 255 is shown in FIGURE 2 to comprise a sealed casing 256 and a register drive gear train 258 mounted on casing 256. Casing 256 is integral with cover plate 240 and receives the upper end of shaft 218. A pinion 262 mounted on the upper end of shaft 220 in casing 256 constantly meshes with the input gear of gear train 258 to drive a register input shaft 264. Register assembly 254 preferably is of the sealed type as shown in United States Letters Patent No. 2,858,461 issued on Oct. 28, 1958 to which reference is made for further detail.

With the foregoing meter structure, it will be appreciated that rotor 58 rotates only in response to fluid flow through channel 50, and the number of turns made by the rotor are registered in conventional units by register assembly 255.

From the foregoing description, it is clear that the interior of core 48 receiving pinion 176 and crown gear 182 is sealed off to prevent entry of fluid flowing through the meter. This prevents foreign particles and like matter from settling on pinion 176 and gear 182 and interfering with the operation of the meter.

As shown in FIGURE 2, a fluid guide vane assembly 270 is selectively operable to adjust the direction of fluid flow through the blades of rotor 58 for calibrating the meter. Assembly 270 comprises a vane shaft 272 which coaxially, rotatably extends through a bore 274 formed in cover plate 240 along an axis normally intersecting the rotational axis of rotor 58. Shaft 272 extends downwardly through an aperture 276 aligning with bore 274 and formed in sleeve 34. The lower end of shaft 272 terminates in channel 50 immediately upstream from blades 64 and downstream from ribs 43. An adjustment guide vane 280 comprising a flat-sided plate is fixed in a downwardly opening slot formed in the lower end of shaft 272. The upper end of shaft 272 is threaded to receive a nut 284. An annular, radially extending shoulder 286 formed integral with shaft 272 extends between cover plate 240 and sleeve 34 and is drawn tightly against the flanged end of a sleeve bearing 288 by tightening nut 284. Bearing 288 journals shaft 272 in bore 274. The assembly of shaft 272 and guide vane 280 is thus axially retained in place by engagement of nut 284 with cover plate 240 and by engagement of shoulder 286 with bearing 288 on the underside of cover plate 240. The upper end of shaft 272 advantageously is formed with a slot for receiving a suitable tool such as a screwdriver to permit the assembly of shaft 272 and guide vane 280 to be rotated about the shaft axis when nut 284 is loosened.

To provide for highly accurate volumetric measurements with meters of the type just described it is particularly desirable to minimize the torque resisting fluid driven rotation of rotor 58. These resistive torques are, in part, due to mechanical friction resulting from the rotatable support for rotor 58. In accordance with this invention, the radius to the interface between bore 70 and bearings 84 and 86 is made very small owing to the unique construction of support member 78 and post 82. The resistive torque resulting from friction at the interface between bore 70 and bearings 84 and 86 thus is correspondingly minimized. On the other hand, the arrangement and construction of rotor 58 and support member 78 provide for a relatively large drive torque arm between magnets 132 and 150.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid flow meter comprising a housing having fluid inlet and outlet openings, a relatively rigid tubular mounting member of non-magnetic material disposed in said housing and having a closed end, a rigid post provided on the closed end of said mounting member in axial alignment therewith, a peripherally bladed metering rotor formed with a hub receiving said post and the closed end of said mounting member, bearing means journalling said rotor on said post, said bearing means being mounted only on said post and providing the sole rotational support for said rotor within said housing, means for mounting said tubular member in said housing and for directing motive fluid into the blades of said rotor in an annular stream extending coaxially with respect to the rotor rotational axis, a drive magnet fixed in said hub radially outwardly of said tubular mounting member, a shaft rotatably mounted within said tubular member, a driven magnet fixed on said shaft and being radially magnetically coupled to said drive magnet through the side wall of said tubular member, and means drive connecting said shaft to a register means for actuating the latter in response to rotation of said rotor and said drive magnet, the radial torque arm between said drive and driven magnets being substantially greater than the torque arm radius at the interface between the relatively movable, engaging surfaces of said bearing means and said rotor where frictional forces act to resist rotation of said rotor.

2. The fluid flow meter defined in claim 1 wherein said means directing motive fluid into the blades of said rotor comprises a pair of axially spaced apart cores one of said cores being hollow and having an axially open end facing said rotor, said hub having an elongated nose portion receiving said post and extending into the open end of said one core in axially spaced relation to the space between said cores, the rotor blades radially aligning with the space between said cores and with said drive and driven magnets.

3. The fluid drive meter defined in claim 2 wherein said bearing means comprises axially spaced apart sleeve bearings mounted on said post and engaging the inner periphery of said hub, the diameter of said bearings being appreciably less than the diameter of said tubular member.

4. The fluid flow meter defined in claim 1 wherein said drive and driven magnets are annular permanent magnets.

5. A fluid flow meter comprising a housing having fluid inlet and outlet openings, a peripherally bladed metering rotor, means mounted in said housing for rotatably supporting said rotor and for directing motive fluid into the blades of said rotor in an annular stream extending coaxially of the rotor rotational axis, register means, means including a magnetic coupling assembly drive connecting said rotor to said register means for actuating the latter in response to rotation of the former, said rotor being formed of a material having a specific gravity substantially equal to that of the fluid being metered, said rotor being formed with a hub having an axially opening recess therein and said magnetic coupling assembly comprising (a) a drive magnet seated in said recess for coaxial rotation with said rotor and (b) a driven magnet mounted for rotation coaxially of and substantially coextensive with said drive magnet within said recess, and means including passages formed in said hub for establishing fluid communication between said recess and said annular stream.

6. A fluid flow meter comprising a housing having fluid inlet and outlet openings, a bladed fluid impelled rotor rotatably supported in said housing to be driven by fluid flow therethrough, a fluid guide structure mounted in said housing and defining therewith a fluid flow channel of annular cross-section for directing motive fluid into the blades of said rotor, said rotor being formed with a hub peripherally supporting the rotor blades in the path of fluid flow through said channel, a drive magnet mounted in said hub for rotation with said rotor, a driven magnet magnetically coupled to said drive magnet and being rotatably mounted coaxially of and substantially coextensively with said drive magnet, said drive and driven magnets being annular and coaxially rotatable about an axis axially aligning with the rotational axis of said rotor, register means, a drive train drive connecting said driven magnet to said register means for actuating said register means in response to rotation of said drive magnet by said rotor, said drive train including gear means providing for axial movement of said driven magnet relative to said drive magnet to enable said driven magnet to align itself with said drive magnet under the influence of the magnetic interaction therebetween, a tubular mounting member made of non-magnetic material and having a closed end received in said hub and being circumferentially surrounded by said drive magnet, a shaft forming a part of said drive train and coaxially mounting said driven magnet within said tubular member, bearing means rotatably supporting said shaft in said tubular member for limited axial displacement, said gear means comprising a pinion gear mounted on said shaft and a crown gear constantly meshing with said pinion gear, shaft means forming a part of said drive train and supporting said crown gear for rotation about an axis normally intersecting the rotational axis of said shaft, a hollow core member forming a part of said core structure and having an open end, means cooperating with said tubular member and including a plate member at the open end of said core member for providing a fluid tight chamber within said core member, the open end of said tubular member being mounted in said plate member, and said pinion and crown gears being disposed in said chamber, a bracket rotatably supporting said shaft means and means detachably securing said bracket to said plate member within said chamber, said rotor being formed with a material having a specific gravity substantially equal to that of the fluid being metered.

7. A fluid flow meter comprising a housing having fluid inlet and outlet openings, a bladed fluid impelled rotor rotatably supported in said housing to be driven by fluid flow therethrough, a drive magnet mounted for rotation with said rotor, a driven magnet magnetically coupled to said drive magnet and being rotatably mounted coaxially of and substantially coextensively with said drive magnet, register means, a drive train connecting said driven magnet to said register means for actuating the latter in response to rotation of said drive magnet by said rotor, a shaft forming a part of said drive train and fixedly mounting said driven magnet, bearing means rotatably supporting said shaft in said housing, motion transmitting means forming a part of said drive train and being operatively connected to said register means, coacting pinion and crown gear means forming a part of said drive train for drive connecting said shaft to said motion transmitting means, said pinion and crown gear means cooperating with said bearing means to provide for sufficient axial movement of said shaft under the influence of the magnetic interaction between said magnets to enable said driven magnet to align itself with said drive magnet, said pinion and crown gear means comprising a pinion gear and a crown gear, said pinion gear being mounted on said shaft, and said motion transmitting means including shaft means mounting said crown gear and being rotatable in said housing about an axis transversely intersecting the rotational axis of said shaft, said crown and pinion gears having constantly intermeshing teeth sets that coact to enable the assembly of said pinion gear, said shaft and said driven magnet to be axially displaced toward and away from said shaft means without interfering with the motion transmitting drive connection provided by said pinion and crown gears, a fluid guide core structure mounted in said housing and defining therewith a fluid flow channel of annular cross section for directing motive fluid to be metered past the blades of said rotor, a hollow core member forming a part of said fluid guide core structure and having an open end, an end plate covering said open end of said core member, a single resilient, split retainer ring detachably holding said end plate in place in the open end of said core member, a tubular well receiving said driven magnet and being disposed radially inwardly of said drive magnet, and means cooperating with said well and said end plate to define a fluid tight chamber in said core member, said shaft, said shaft means, said driven magnet and said crown and pinion gears being received in said chamber.

(References on following page)

References Cited

UNITED STATES PATENTS

| | | | |
|---|---|---|---|
| 2,770,131 | 11/1956 | Sparling | 73—231 |
| 2,842,963 | 7/1958 | Ardley | 73—231 |
| 3,163,041 | 12/1964 | Karlby et al. | 72—231 |
| 3,182,504 | 5/1965 | Henhouse et al. | 73—231 |

FOREIGN PATENTS

| | | |
|---|---|---|
| 14,060 | 4/1852 | Great Britain. |
| 841,952 | 6/1952 | Germany. |

RICHARD C. QUEISSER, *Primary Examiner.*

JAMES J. GILL, *Examiner.*

EDWARD D. GILHOOLY, *Assistant Examiner.*